March 4, 1969 H. SIEGEL ET AL 3,431,365
CIRCUIT ARRANGEMENT TO RELEASE REGISTERS IN TELECOMMUNICATION EXCHANGES
Filed July 19, 1965
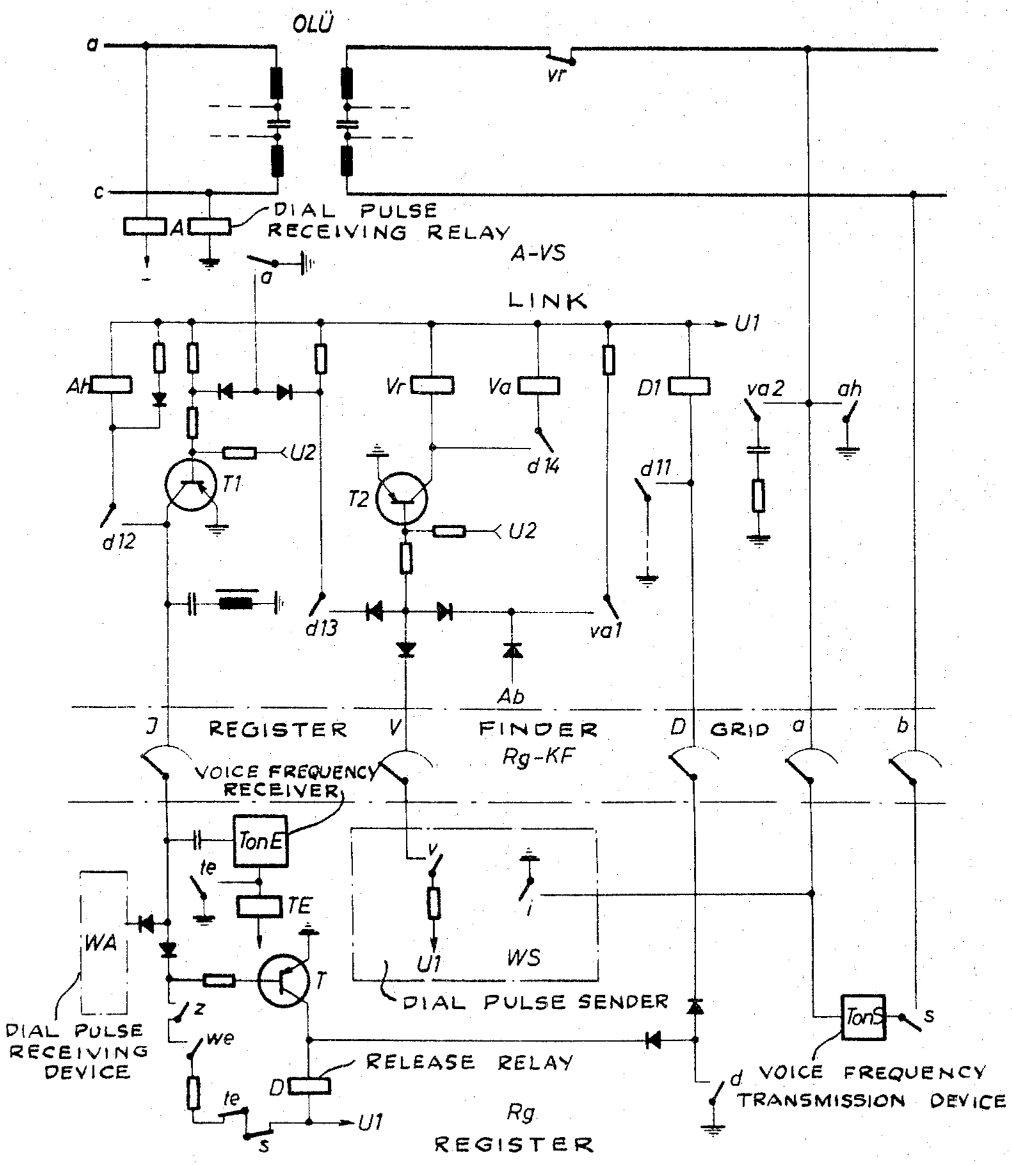

United States Patent Office 3,431,365
Patented Mar. 4, 1969

3,431,365

CIRCUIT ARRANGEMENT TO RELEASE REGISTERS IN TELECOMMUNICATION EXCHANGES

Herbert Siegel, Munchingen, and Walter Hackenberg, Hirschlanden, Germany, assignors to International Standard Electric Corporation Filed July 19, 1965, Ser. No. 473,089
Claims priority, application Germany, July 25, 1964, St 22,458
U.S. Cl. 179—18 5 Claims
Int. Cl. H04m 3/00

ABSTRACT OF THE DISCLOSURE

A circuit arrangement is provided to permit the quick release of registers in telephone exchanges after dial information required to establish a connection has been received and processed. The arrangement operates using dial information either in the form of pulses or multi-frequency signals.

This application relates to register circuitry and more particularly to arrangements for releasing registers in telephone exchanges wherein the connecting links contain switching means for directly advancing the received dial pulses and in which the register releases instantaneously when the dial information, required to establish the connection has been received and processed. Such circuit arrangements are advantageous in that the register is released at the earliest possible time, and made available for another connection. Therefore, the number of registers can essentially be reduced.

Such circuit arrangements now known to the art, however, encounter difficulties when telephone system dial switches and key-dialing subscriber sets are both connected and have access to the same registers.

An example of the latest in prior art circuit arrangements can be found in a copending patent application Ser. No. 400,026, filed on Sept. 29, 1964, now abandoned, entitled "Circuit Arrangements To Release Registers in Telecommunication, Particularly Telephone Systems," and assigned to the assignee of this invention.

In the systems described therein the release of the register is not practicable when key-dialing sets and normal dials are both used in the system. Further difficulties for disconnecting the register occur when outgoing lines operating with voice-frequency signalling are available.

It is the object of this invention to improve the circuit arrangement for releasing registers in telephone exchanges so that despite different dialing processes on incoming and outgoing lines, the most favorable release period is always achieved, and so that the register remains seized only when required to advance the signal.

The circuit arrangement according to the invention, is characterized in this, that the register contains special switching means for discerning between terminating dial pulses (originating from dial switches) and terminating key-dialing code signals, and that the register contains special means for advancing terminating key-dialing code signals and/or voice-frequency signals as well as advancing regular dial impulses in the connecting link, and for preventing the premature release of the register as well as for advancing the dial information in the connecting link, independently of the establishment of a connection in the registers exchange system.

In the inventive register release arrangement the advantages of the copending patent application above cited are available for pulse dialing. For code dialing, the inventive register takes over to advance the dial information items. Since the voice-frequency control systems are equipped in most cases with end-of-dialing signals or end-of-selection signals, the further embodiment of the circuit arrangement, according to the invention, provides that the release of the register is initiated by either an end-of-dialing signal or end-of-selection signal, received by said register.

In order to discern whether the terminating dial information is in the dial pulse or key-dialing form, voice-frequency receivers are provided in the registers which simultaneously serve to evaluate the code signals.

The release of the register besides depending on the type of arriving dial information, must also depend upon what signaling is required for a further establishment of the connection. A signal produced by the control facility when a line operating with voice-frequency signaling is seized prevents the premature release of the register and ascertains that arriving dial pulses are converted into the voice frequency signals. The conversion is accomplished with the aid of dial pulse receiving facilities in the register. The signaling code can be changed at any time, when the code of the arriving key-dialing code signal does not coincide with the signal code of the subsequent line.

The invention will now be explained in detail with the aid of the drawings showing a preferred embodiment of the invention.

A brief description of certain aspects of the invention showing both structure and operation will first be presented. Dial pulses or voice frequency signals are received over lines *a* and *c*, when the subscriber loop (not shown) is closed, causing the dial pulse receiver relay A to operate. The dial pulse receiving relay A of the link A–VS keeps the transistor T1 blocked through its contact *a*, as long as the subscriber's loop is closed. Loop interruptions during the dialing process render the transistor conductive and are advanced as ground pulses to the dial-pulse receiving device WA of the register R*g* via the line J of the register-finder switching grid R*g*–KF.

When the register R*g* has stored the digits required to establish a connecting path within the originating office, said path or route is established in a known way. Contact *we* now closes in the register (employing a relay which is not shown, but which would be readily available in a conventional register circuit).

Before closure of contact *z* the following conditions must be met:

(1) A sufficient time must have elapsed to allow for the seizure of transmission routes and/or for the hunting time of selectors to make connections to a dial pulse receiving device at the end of the line section being called.

(2) The register must hold no dial digits for setting connecting sections beyond the originating exchange, i.e., the stored digits must have been transferred out or read out.

When the contacts *we* and *z* have closed, negative potential is applied to the base of transistor T via the contacts *we* and *z*, which transistor closes through its base-emitter circuit the operating circuit for relay D. If a new dial pulse arrives prior to closing of contact *d* this pulse can still block, practically in no time, the transistor T of the register via transistor T1 of the connecting link A–VS and the operating circuit for relay D will be interrupted again.

Contact *z* opens again when dial pulses are received in the dial pulse receiving device WA, because condition 2 is no longer met. This dial pulse series is then transferred out through the dial pulse sender WS via contact *i*. While a pulse series is being transferred out, the transistor T2 becomes conductive under control of contact *v* of the register and operates relay V*r* which disconnects through its contact *vr* the transformer OLÜ from the *a*-wire. When the pulse sequence has ceased, contact *vr* closes again and the connecting link A–VS is through-connected for speech (announcement, subscriber's answer, etc.).

After transfer out and expiration of the allowed time, which may differ for local and toll connections, contact *z* closes again, and again through-connects the operating circuit for relay D. Contact *d* closes the holding circuit for relay D and simultaneously operates relay D1 of the connecting link A–VS via lead D within 2 to 3 milliseconds. Said relay D1 is held by its own contact *d*11. The contacts *d*12, *d*13, *d*14 connect the pulse relay A*h* with transistor T1 and prepare the V-relays V*a* and V*r*. The register and the register switching grid releases. The probable mutilation of the first impulse of a dial-pulse series due to switching off the register is limited to a minimum due to the quick switching over.

At the following loop interruption, relay A*h* can respond. It provides ground pulses through its contact *ah* during the loop interruptions onto the extending *a*-wire. A damping circuit, in parallel to relay A*h*, protects the transistor T1 and matches pulse distortions. The V-relays V*a* and V*r* are now operated by transistor T2 and are held via contact *va*1 until at the end of the pulse series a release pulse from a timing circuit, not shown on the drawing, blocks the holding circuit via A*b*. Contact *vr* disconnects the *a*-wire to avoid pulse distortions caused by the transformer OLÜ, and contact *va*2 connects an R/C spark-quenching circuit for the pulse-contact *ah*.

Dial pulses, calling the operator's position, and handset restoring impulses are advanced respectively by the A–VS directly, i.e., without the register participating.

As shown in the drawing and previously described, the arriving dial information is transmitted from the link A–VS to the register R*g* via the J-wire of the register finder grid R*g*KF. In case of dial pulses, the dial pulse receiving relay A in the link forwards the pulses directly to the dial pulse receiving device WA of the register. When sufficient dial information items are received by the register the connection is established through the following section. The release of the register is initiated through the switching means *we*, after an advance time *z*. The switching means D in the register responds and through the switching means D1 in link A–VS the switching means A*h* is connected which transmits the arriving pulses directly onto the outgoing line.

The register is immediately switched off, i.e., released and is ready to establish another connection.

When voice-frequency key-dialing code signals arrive through the link A–VS, the voice frequency signals are led, for example, via a separate winding of the buffer transformer OLÜ and the J-wire of the register finder grid R*g*KF to the voice-frequency receiver T*on*E in the register. The receiving controls, at a first response, a switching means TE, kept operative in its own holding circuit. The voice frequency receivers supply, in a way known to the art and previously described above, the dial pulse receiving facility WA. The connection is established through the centrally arranged control device in a way known to the art. When the connection in the exchange has been completed, the switching means *we* initiates the release of the register. Since the starting circuit of the release relay D is interrupted through contact *te*, the register remains operative in this case, till an end-of-dialing signal, emitted from the calling subscriber arrives or an end-of-selection signal is received from the destination point. Since a quick dialing method is concerned in this signaling, the additional signal does not cause a perceivable loss of time.

Independent of the kind of dial information to be advanced the release of the register is prevented. The register must remain connected for pulse dialing as well as for coded voice-frequency dialing because the voice-frequency receivers, required to evaluate the register arriving key-dialing code signals, are located in the register.

If dial pulses arrive through the link A–VS, the connection is further established to an outgoing line, after receipt of a sufficient dial information, by the centrally located control device. In greater detail, a transformer is associated with said line which may indicate the voice-frequency signaling to the following exchange. When establishing such a connection a signal *s* may be produced in any way known to the art, which signal is led to the register R*g* to prevent the release of the register. The register R*g* includes the voice-frequency transmission device T*on*S, required to advance voice-frequency dialing signals. Through a contact *s* in the starting circuit of the release relay D, the release of the register is prevented, and another contact *s* connects the voice-frequency transmission devices T*on*S with the outgoing line *a*, *b*.

It is thereby secured that the dial information items are converted in the register R*g*. The necessary voice-frequency devices can also be accommodated in the register.

While the principles of the invention have been described above in connection with specific apparatus and applications, it is to be understood that this description is made only by way of example and not as a limitation on the scope of the invention.

We claim:

1. A circuit arrangement for releasing registers associated with links in telephone systems, switching means in the said links for forwarding received dial information, means for seizing one of said registers, means responsive to the seizure of one of said registers for connecting said switching means to said seized register, selecting means for selecting an available connection route, means in said register coupled to the selecting means for setting the said selecting means, release means for releasing the said register when it has accepted the digits required to establish a section of the connection route and when it has set the selecting means, further means coupled to switching means for discerning between dial switch pulses and key-dialing code signals, and means coupled to said switching means for preventing the premature release of said seized register and for forwarding the dial information in the link responsive to either key-dialing code signals or voice-frequency signals.

2. A circuit arrangement according to claim 1 wherein said release means comprises means for releasing the seized register responsive to either an end-of-dialing signal or an end-of-selection signal.

3. A circuit arrangement according to claim 1 wherein the seized register comprises voice-frequency receiver means for detecting the arrival of key-dialing code signals.

4. A circuit arrangement according to claim 1, and special means responsive to establishing a connection for deriving a supervisory signal on a line operated with voice-frequency signaling, means responsive to said supervisory signal for preventing the release of the seized register and means for initiating the advance of the dial information in the register.

5. A circuit arrangement according to claim 4, and means for converting said received dial information to be compatible with signals required by the advancing connection.

References Cited

UNITED STATES PATENTS

| | | | |
|---|---|---|---|
| 3,133,155 | 5/1964 | Kuchas | 179—18 |
| 3,328,530 | 6/1967 | Schildgen et al. | 179—18 |

WILLIAM C. COOPER, *Primary Examiner.*

ALBIN H. GESS, *Assistant Examiner.*